United States Patent
Pitigoi-Aron et al.

(10) Patent No.: US 9,497,807 B2
(45) Date of Patent: Nov. 15, 2016

(54) DIMMER CIRCUIT FOR ELECTRONIC LOADS

(75) Inventors: Radu Pitigoi-Aron, San Jose, CA (US); Wanfeng Zhang, Palo Alto, CA (US); Jinho Choi, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 198 days.

(21) Appl. No.: 13/023,379

(22) Filed: Feb. 8, 2011

(65) Prior Publication Data

US 2011/0199014 A1  Aug. 18, 2011

Related U.S. Application Data

(60) Provisional application No. 61/303,835, filed on Feb. 12, 2010.

(51) Int. Cl.
*H05B 37/02* (2006.01)
*H05B 33/08* (2006.01)

(52) U.S. Cl.
CPC ......... *H05B 33/0815* (2013.01); *Y02B 20/383* (2013.01)

(58) Field of Classification Search
CPC .............. H05B 37/02; H05B 33/0803; H05B 33/0809; H05B 33/0815; H05B 33/0833; H05B 33/0839; H05B 33/0845; H05B 41/38; H05B 41/39; H05B 41/392; H05B 41/3924; H05B 41/3927
USPC .... 315/194, 209 R, 219, 224, 246, 276, 291
See application file for complete search history.

(56) References Cited

U.S. PATENT DOCUMENTS

| | | | |
|---|---|---|---|
| 5,585,713 A * | 12/1996 | Crane | H05B 41/3924 323/235 |
| 6,831,426 B2 | 12/2004 | Brevetti et al. | |
| 7,019,469 B1 | 3/2006 | Thurk et al. | |
| 7,358,679 B2 | 4/2008 | Lys et al. | |
| 7,649,327 B2 | 1/2010 | Peng | |
| 8,222,832 B2 * | 7/2012 | Zheng et al. | 315/291 |
| 8,228,001 B2 * | 7/2012 | Fan | 315/291 |
| 8,441,210 B2 * | 5/2013 | Shteynberg et al. | 315/308 |

(Continued)

FOREIGN PATENT DOCUMENTS

| | | |
|---|---|---|
| JP | 2002-175896 | 6/2002 |
| JP | 2004-273267 | 9/2004 |

(Continued)

OTHER PUBLICATIONS

International Searching Authority, "International Search Report", Application No. PCT/US2011/024083, Mar. 30, 2011.

(Continued)

*Primary Examiner* — Thuy Vinh Tran (57) ABSTRACT

In one embodiment, a dimmer circuit is coupled to an electronic load and receives an alternating current (AC) signal. A phase control circuit turns the dimmer circuit on for a first portion of the AC signal to turn on the electronic load. The dimmer circuit turns off during a second portion of the AC signal to turn off the electronic load. A switch is coupled to the phase control circuit. The switch is controlled to couple the phase control circuit to ground when the dimmer circuit is off where the switch is part of a power supply supplying power to the electronic load.

23 Claims, 6 Drawing Sheets

(56) References Cited

U.S. PATENT DOCUMENTS

2005/0275354 A1\* 12/2005 Hausman et al. ............ 315/291
2009/0261744 A1   10/2009 Chen et al.
2011/0175532 A1\*  7/2011 Peng ............................ 315/119
2011/0194312 A1\*  8/2011 Gaknoki et al. ........... 363/21.12

FOREIGN PATENT DOCUMENTS

JP       2007-035403      2/2007
WO    WO 2010/011971 A1    1/2010

OTHER PUBLICATIONS

Extended European Search Report issued on Jul. 26, 2013 in European Application No. 11742694.0.
Rand, D., et al., "Issues, Models and Solutions for Triac Modulated Phase Dimming of LED Lamps", Power Electronics Specialists Conference, 2007, PESC 2007, IEEE, IEEE, Piscataway, NJ, USA, Jun. 17, 2007, pp. 1398-1404.
Communication pursuant to Article 94(3) EPC issued May 29, 2015 in European Patent Application No. 11 742 694.0.

\* cited by examiner

DIMMER CIRCUIT FOR ELECTRONIC LOADS

CROSS REFERENCE TO RELATED APPLICATIONS

The present disclosure claims priority to U.S. Provisional App. No. 61/303,835 for "TRIAC Dimmer Driver Method and Circuit" filed Feb. 12, 2010, which is incorporated herein by reference in its entirety for all purposes.

BACKGROUND

Particular embodiments generally relate to dimming of electronic devices.

Unless otherwise indicated herein, the approaches described in this section are not prior art to the claims in this application and are not admitted to be prior art by inclusion in this section.

A dimmer, which includes a triode for alternating current (TRIAC), is used for dimming of incandescent lamps. The dimmer may use forward or reverse phase control. Both phase control schemes chop an alternating current (AC) line voltage either at the beginning of the half sine waveform (forward phase control) or at the end of the half sine waveform (reverse phase control). This stops the power delivered to the incandescent lamp for an adjustable/controllable part of the sine waveform, which is referred to as a non-conduction angle. The ratio between the conduction portion and the full waveform defines the dimming level.

The above type of dimming uses the characteristics of the TRIAC. For example, the TRIAC can be turned on at a controlled moment and after that, the TRIAC stays in full conduction until the current through the TRIAC goes under a sustaining level in either direction. For example, when the sine waveform crosses zero, the current goes below the sustaining level and the TRIAC is turned off. In the case of an incandescent lamp, which is essentially a resistive value, the passing current is higher than the sustaining level while the TRIAC is turned on. Thus, problems with the current through the TRIAC going below the sustaining level most likely do not occur when the TRIAC is connected to an incandescent lamp.

Figure 1:
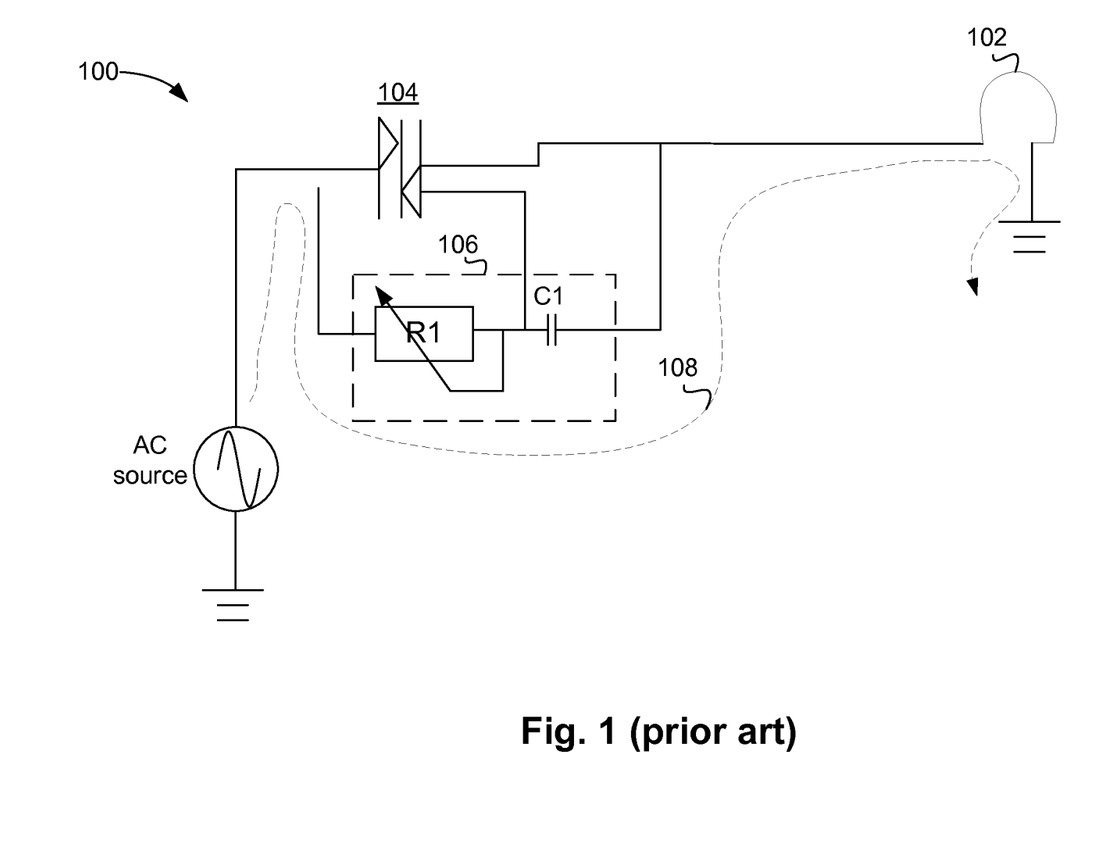
FIG. 1 depicts an example of a dimming circuit.

FIG. 1 depicts an example of a dimming circuit 100. A phase control circuit 106 is used to provide the phase control signal to turn on a TRIAC 104 at a controlled moment. To operate phase control circuit 106, a variable resistor R1 and a capacitor C1 are mounted in series with an incandescent lamp 102. Incandescent lamp 102 acts as a resistive load and offers a continuous path 108 to ground that allows current to flow through variable resistor R1 and capacitor C1 when the TRIAC is turned off. This allows a continuous flow of current that charges the capacitor in a desired amount of time that is set by variable resistor R1. The amount of time is set based on the conduction angle that is desired.

Electronic loads, such as light emitting diodes (LEDs) or fluorescent lamps, are replacing incandescent lamps. These electronic loads may not offer ideal conditions for dimmers using TRIACs. For example, the electronic loads do not intrinsically offer a continuous path to ground for the phase control circuit to charge the capacitor because the electronic loads do not provide a resistive load that allows current to flow to ground. Also, a sufficient sustaining current to keep the TRIAC turned on may not be provided.

One example uses dummy loads that supplement the missing conditions of the electronic loads to allow for proper functioning of the TRIAC. For example, a dummy load is added to allow the current to flow in a continuous path to ground. However, using the dummy load uses extra energy and also requires additional components for the system, which adds cost.

SUMMARY

In one embodiment, a dimmer circuit is coupled to an electronic load and receives an alternating current (AC) signal. A phase control circuit turns the dimmer circuit on for a first portion of the AC signal to turn on the electronic load. The dimmer circuit turns off during a second portion of the AC signal to turn off the electronic load. A switch is coupled to the phase control circuit. The switch is controlled to couple the phase control circuit to ground when the dimmer circuit is off where the switch is part of a power supply supplying power to the electronic load.

In one embodiment, the switch includes a transistor included in the power supply.

In one embodiment, the transistor is driven with a driver signal to turn the transistor on when the dimmer circuit is off to provide a path to ground.

In one embodiment, the electronic load includes a light emitting diode (LED) or fluorescent light.

In one embodiment, a method includes turning a dimmer circuit off during a first portion of an AC signal. An electronic load is turned off when the dimmer circuit is off. The method also includes controlling a switch to couple the AC signal through a phase control circuit to ground when the dimmer circuit is off. The switch is part of a power supply supplying power to an electronic load. The method then includes turning the dimmer circuit on for a second portion of the AC signal using the phase control circuit to turn on the electronic load.

The following detailed description and accompanying drawings provide a more detailed understanding of the nature and advantages of the present invention.

DETAILED DESCRIPTION

Described herein are techniques for a dimmer. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 2:
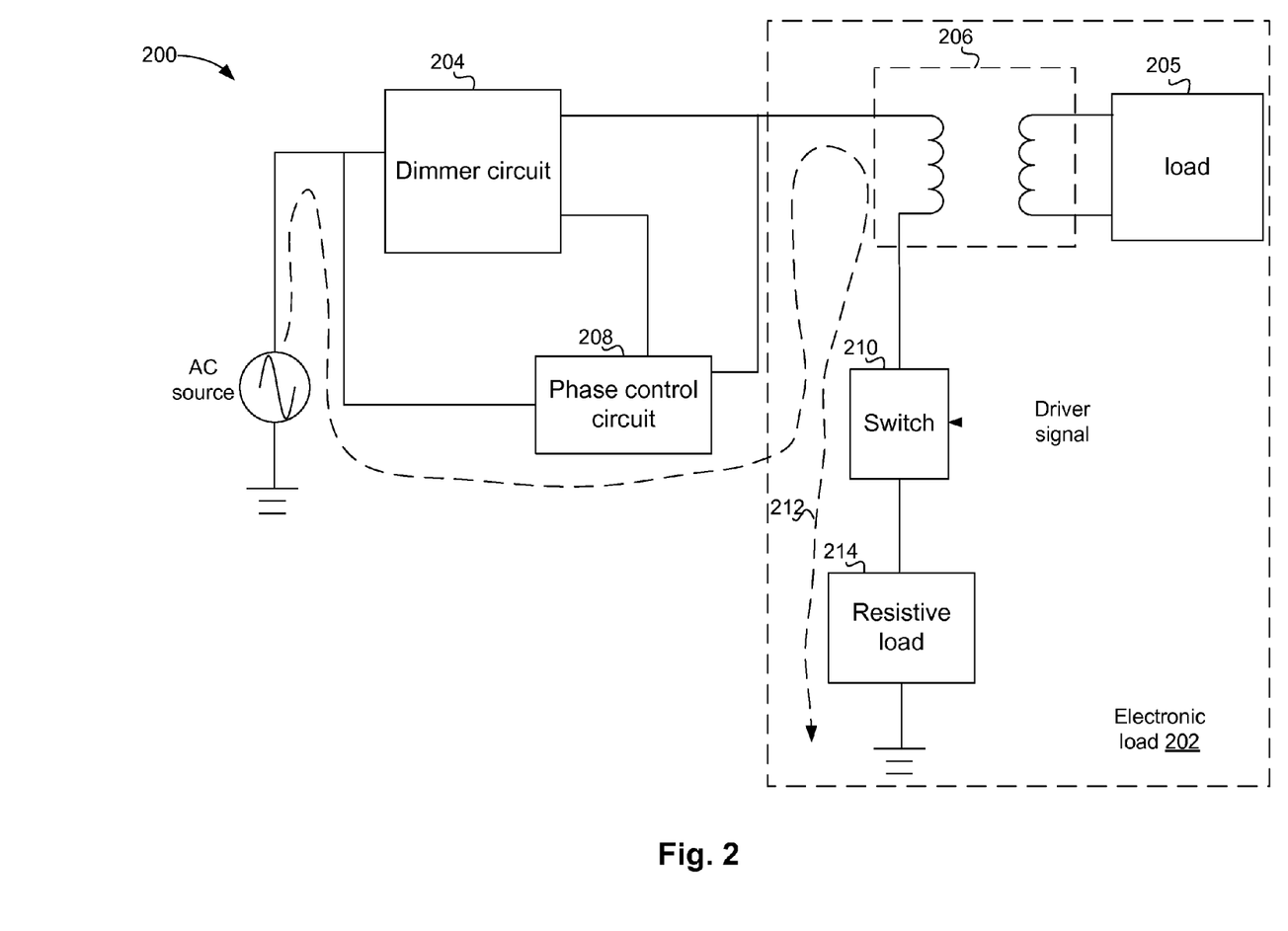
FIG. 2 depicts an example of a system for driving an electronic load according to one embodiment.

FIG. 2 depicts an example of a system 200 for driving an electronic load 202 according to one embodiment. An alternating current (AC) source provides an AC signal that is used to drive electronic load 202. Electronic load 202 may be a controllable electronic load. For example, electronic load 202 may be a switch mode power supply (SMPS). In one embodiment, electronic load 202 includes a load 205, a transformer 206, a switch 210, and a resistive load 214. Different configurations of electronic load 202 may be used. For example, the configuration shown in FIG. 2 is a flyback converter, but a buck or boost converter may be used.

Load 205 may be electronic circuitry driven by transformer 206. For example, load 205 includes LED circuitry or a fluorescent light circuitry. Load 205 may not have a sufficient resistive value to provide a continuous path to ground. When a sufficient voltage is applied to load 205, load 205 turns on and emits light.

A dimmer circuit 204 is used to provide dimming for electronic load 202. Dimmer circuit 204 may include two states, a conductive or on state and a non-conductive or off state.

In one embodiment, dimmer circuit 204 includes a TRIAC (triode for alternating current). Dimmer circuit 204 can be triggered to turn on at a controlled moment by applying a positive or negative voltage, such as by an AC source, to dimmer circuit 204. Once dimmer circuit 204 is turned on, dimmer circuit 204 continues to conduct until the current through dimmer circuit 204 drops below a certain threshold value. For example, when the AC signal crosses zero, dimmer circuit 204 will switch off.

Switch 210 may be part of the switch mode power supply (SMPS). For example, switch 210 may be a power metal-oxide-semiconductor field-effect transistor (MOSFET) that is used in the SMPS. In one example, the MOSFET may be used in power factor correction systems. Also, the SMPS may or may not have power factor correction functionality.

When dimmer circuit 204 is turned on, a sustaining current flows through dimmer circuit 204 and provides a voltage to electronic load 202 via a transformer 206. This stores energy in a primary coil of transformer 206, where the charge is transferred from a secondary coil of transformer 206 to load 205. The transferred charge may turn load 205 on. Dimmer circuit 204 remains on as long as the sustaining current through dimmer circuit 204 remains above a certain level. Also, dimmer circuit 204 turns off when the sustaining current through dimmer circuit 204 goes below a certain level. This turns electronic load 202 off because a voltage delivered to electronic load 202 is not sufficient to turn on electronic load 202. Thus, energy (a charge) is not transferred from the primary coil to the secondary coil during this time to turn load 205 on.

Dimmer circuit 204 remains off until a charge can be introduced into dimmer circuit 204 to turn on. A phase control circuit 208 may be used to turn on dimmer circuit 204. As will be described in more detail below, phase control circuit 208 may include a capacitor (not shown) that is charged to a certain level such that it releases its charge into dimmer circuit 204 to turn on dimmer circuit 204. A current needs to flow through phase control circuit 208 to charge the capacitor while dimmer circuit 204 is off.

Switch 210 is provided to allow a continuous current to flow through phase control circuit 208 when dimmer circuit 204 is off. When dimmer circuit 204 is off, switch 210 may be closed. A resistive load is intrinsically provided by electronic load 202. For example, a resistive component of the primary winding of transformer 206 and the drain-source resistance of a transistor (not shown) in switch 210 when the transistor is on may provide a resistance to allow the current to flow through phase control circuit 208, transformer 206, switch 210, and resistive load 214 to ground as shown by a path 212. Also, a resistive load 214 as shown may be included, but is not necessary. This may charge the capacitor in phase control circuit 208.

When dimmer circuit 204 is off, the current flowing to electronic load 202 is minimal as the capacitor in dimmer circuit 204 is being charged. Thus, a sufficient voltage is not delivered to turn on electronic load 202. Thus, energy is not transferred from the primary coil to the secondary coil during this time to turn load 205 on thereby effectively turning off electronic load 205. When dimmer circuit 204 turns on, a voltage is delivered to electronic load 202 that turns load 205 on. As described above, the energy is stored in the primary coil of transformer 206 and transferred to load 205 via the secondary coil. The switching between on and off states provides dimming.

A driver signal is used to control switch 210. As will be discussed in more detail below, the driver signal is used to turn on a transistor (not shown) such that the transistor is either fully conducting or driven with a controlled duty cycle such that transistor M1 is close to fully conducting when dimmer circuit 204 is turned off. However, if the current through dimmer circuit 204 increases above a certain level, the driver signal may become a pulse-width modulation (PWM) signal that intermittently turns the transistor of switch 210 on and off. This limits the current, which may protect the circuit and provides the energy transfer for load 205. The duty cycle of PWM signal also provides dimming to change the amount of energy transferred to load 205.

Figure 3:
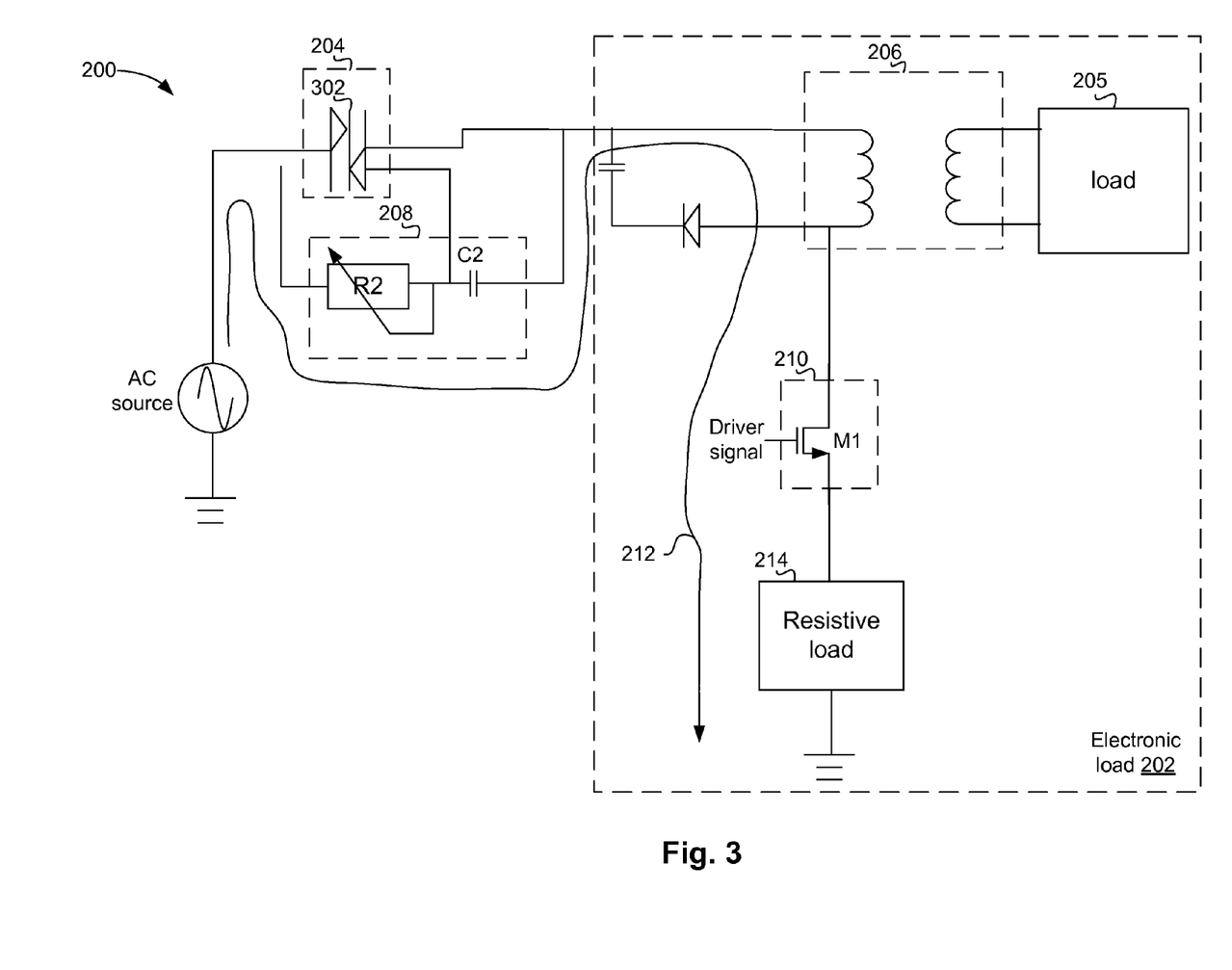
FIG. 3 depicts a more detailed example of a system according to one embodiment.

FIG. 3 depicts a more detailed example of system 200 according to one embodiment. Phase control circuit 208 includes a capacitor C2 and a variable resistor R2. Dimmer circuit 204 includes a TRIAC 302 in this embodiment. The resistive value of resistor R2 is set such that phase control circuit 208 turns TRIAC 302 on at the desired conduction angle.

A driver signal may be used to place a transistor M1 in different states. For example, when TRIAC 302 is turned off, the driver signal may be at a voltage level that turns transistor M1 on such that transistor M1 is fully conducting. At this point, capacitor C2 is charged via a current that is flowing through resistor R1, capacitor C2, a transformer 206, transistor M1, and resistive load 214 (e.g., path 212). When capacitor C2 reaches a certain charge, it releases a charge into a gate of TRIAC 302, which turns on TRIAC 302. The time that TRIAC 302 is turned on can be selected by tuning resistor R2 based on a conduction angle that is desired. For example, the conduction angle is the amount of time that TRIAC 302 is turned on.

In some examples, the control of the conduction angle using resistor R2 and capacitor C2 may be adjusted using a very small duty cycle driver signal when TRIAC 302 is off. The small duty cycle may attempt to charge the capacitor in the desired amount of time. Thus, the duty cycle may be used to keep the conduction angle of phase control circuit 208 as close as possible to the desired conduction time.

TRIAC 302 stays in a turned-on state until the AC signal goes below a sustaining current level. For example, TRIAC 302 may stay turned on until the AC signal crosses zero. At this point, TRIAC 302 turns off. While TRIAC 302 is on, transistor M1 may be driven such that it is fully conducting. However, a threshold may be set and compared to the current that is detected through transistor M1. It may be desirable that the current through transistor M1 while TRIAC 302 is on not exceed a certain level. If the current goes above the threshold, then the driver signal may be changed to limit the current. For example, the driver signal may be a PWM signal with a certain duty cycle. The PWM signal turns transistor M1 on and off to transfer the desired energy to load 205 and also to limit the current through dimming circuit 204. Also, the duty cycle that is used may be varied as per various stages of the driving cycle. For example, the duty cycle may be smaller in the beginning of the conduction time of TRIAC 302, such as to limit the startup current. Then the duty cycle could be varied, such as to achieve the energy transfer level desired in transformer 206 and the characteristics of the desired dimming.

Accordingly, transistor M1 is kept in full conduction as long as the current through transistor M1 is under the threshold. The current that is measured may be proportional with the AC signal's instantaneous value. In one example, the threshold may be a value that is slightly above the maximum value of the sustaining current of TRIAC 302. Also, the value may be computed per an instantaneous value of the AC signal based upon its shape that results after TRIAC 302. Only when the current sensed through transistor M1 goes above the threshold, driver signal starts switching.

Continuing the cycle, when the AC signal crosses zero, TRIAC 302 is turned off. At this point, if the driver signal is a PWM signal, it is changed to turn transistor M1 to fully conduct. The above process then continues as capacitor C2 is charged again. The above cycle is a forward phase control scheme and a person of skill in the art will understand how to implement a reverse phase control scheme based on the teachings and disclosure herein.

The continuous path to ground shown at 212 is provided by reusing transistor M1 and resistive load 214, both of which may be components used by the SMPS powering electronic load 202. This saves power and area on an integrated circuit chip because a dummy load does not need to be added to provide a continuous path to ground.

Figure 4:
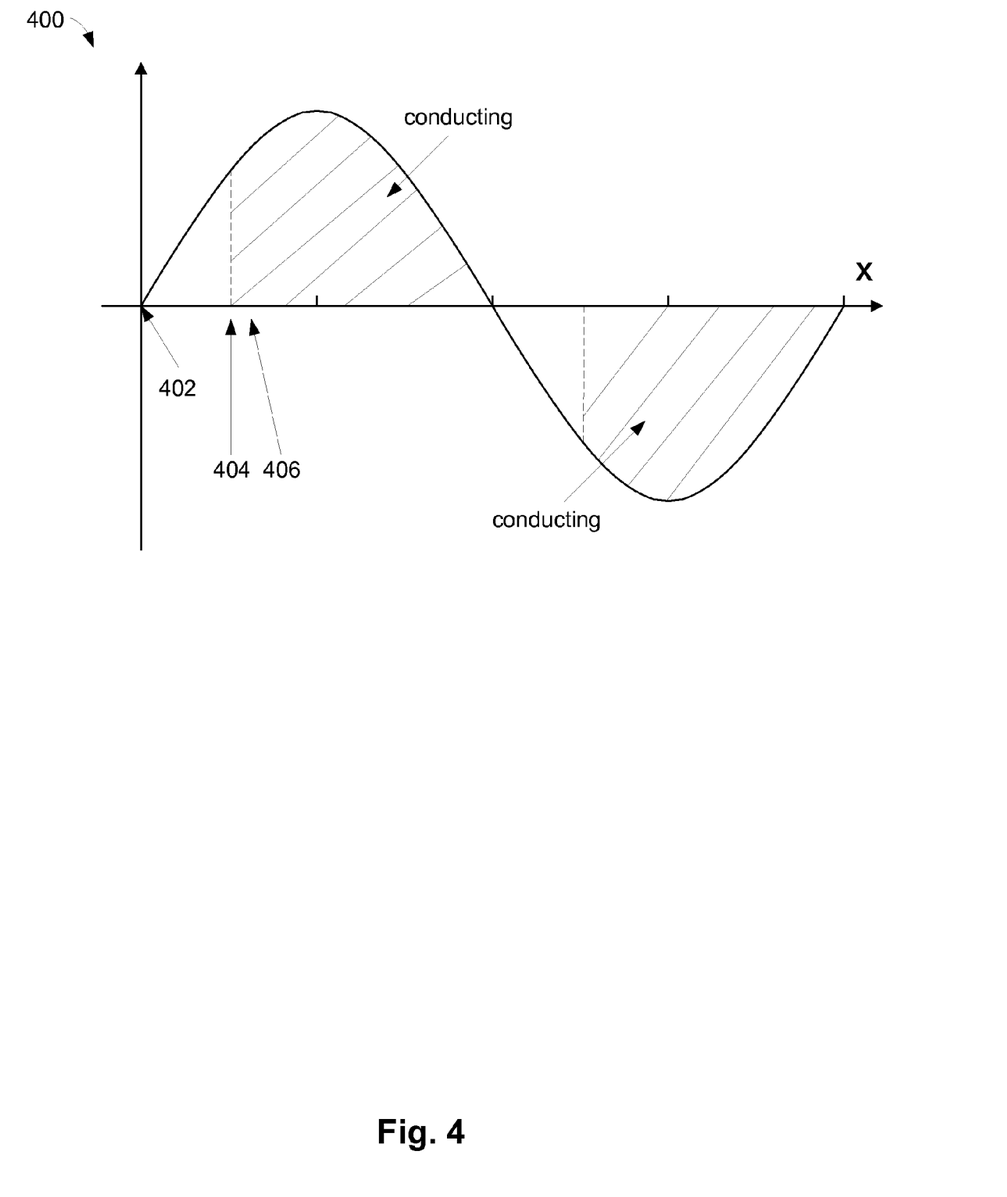
FIG. 4 depicts a graph showing the conduction angle according to one embodiment.

FIG. 4 depicts a graph 400 showing the conduction angle according to one embodiment. The conduction time is shown in areas with shading. During this time, power is being provided to electronic load 202. Power is not being provided for the full cycle of the AC signal and thus dimming of load 205 occurs.

At 402, the driver signal is such that transistor M1 is fully conducting. This is when TRIAC 302 is turned off. During this time, capacitor C2 is being charged.

At 404, capacitor C2 releases its charge into TRIAC 302 to turn TRIAC 302 on. At this point, the driver signal may continue to have transistor M1 fully conduct. Current flows through TRIAC 302 to electronic load 202.

At 406, the current through TRIAC 302 may cross a threshold. At this point, the driver signal may be changed to a PWM signal with a certain duty cycle. That duty cycle may be varied for the rest of the half of AC signal. The threshold may be set close to when TRIAC 302 turns on. In some cases, the PWM signal may be driven with a small duty cycle to limit inrush current to electronic load 202. Then, the PWM signal is changed to a duty cycle to achieve the energy transfer for the dimming characteristics desired. The driver signal is then changed to have transistor M1 fully conduct when the AC signal crosses zero. The process then repeats for the second half of the AC signal.

Figure 5:
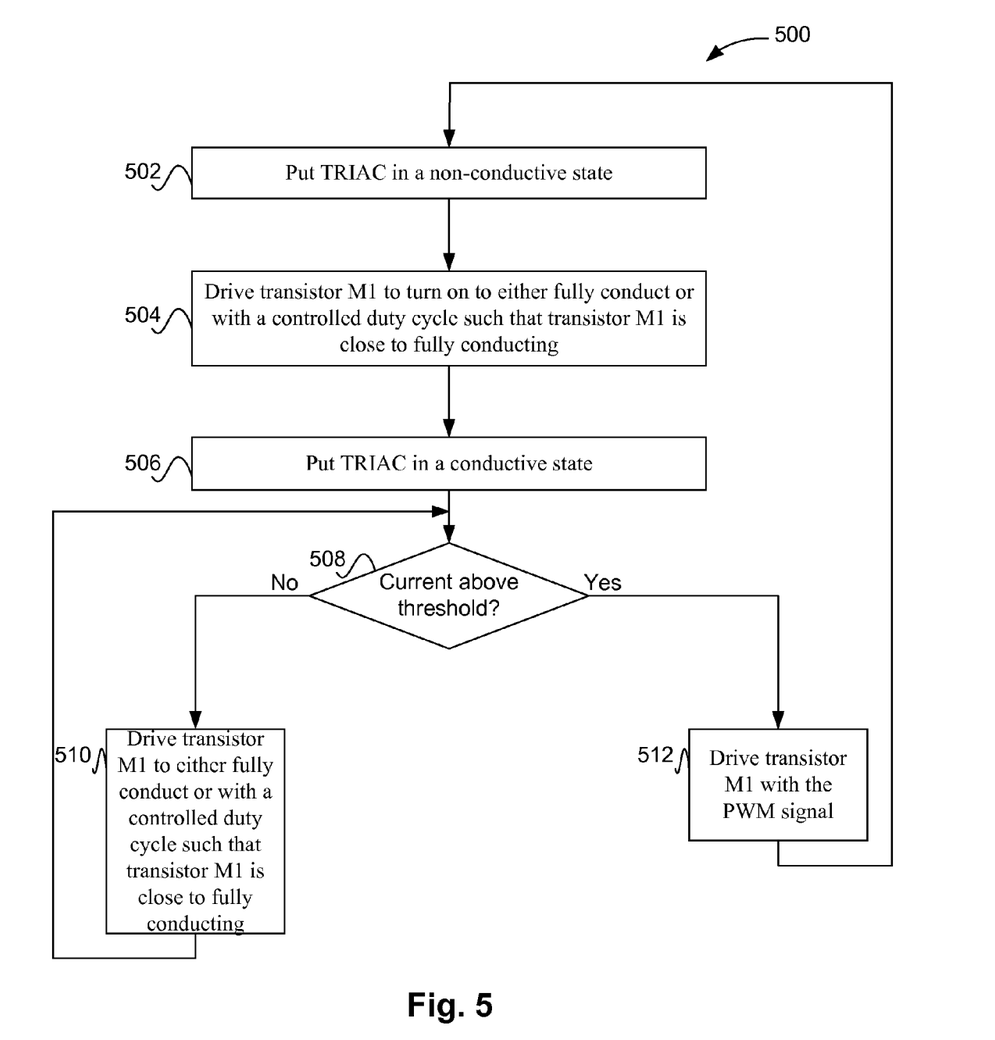
FIG. 5 depicts a simplified flowchart of a method for dimming electronic loads according to one embodiment.

FIG. 5 depicts a simplified flowchart 500 of a method for dimming electronic load 202 according to one embodiment. At 502, TRIAC 302 is put in a non-conductive state.

At 504, transistor M1 is driven to turn the transistor on to either fully conduct or driven with a controlled duty cycle such that transistor M1 is close to fully conducting. At 506, TRIAC 302 is put in a conductive state.

At 508, it is determined if the current is above a threshold. For example, the threshold may be set at a value that is slightly above the maximum current that is desired to flow through resistor R2 in series with capacitor C2 at the peak of the AC signal.

At 510, if the current is not above the threshold, transistor M1 is driven to either fully conduct or driven with a controlled duty cycle such that transistor M1 is close to fully conducting. For example, a voltage is applied to transistor M1 to have transistor M1 fully conduct. This driver signal continues until the current goes above the threshold.

At 512, when the current goes above the threshold, transistor M1 is driven with the PWM signal. The duty cycle may vary based on current through transistor M1. The driving of transistor M1 with the PWM signal may keep the current at the desired level. When TRIAC 302 is put into the non-conductive state, transistor M1 is driven to either fully conduct or driven with a controlled duty cycle such that transistor M1 is close to fully conducting.

Accordingly, particular embodiments use a switch 210, such as transistor M1, to provide a continuous path to ground. Switch 210 may be part of a SMPS that is providing power to electronic load 202. This provides energy savings in that a bleeder circuit or a dummy load is not needed. Also, because switch 210 is already being used by the SMPS, additional components are not needed.

Figure 6:
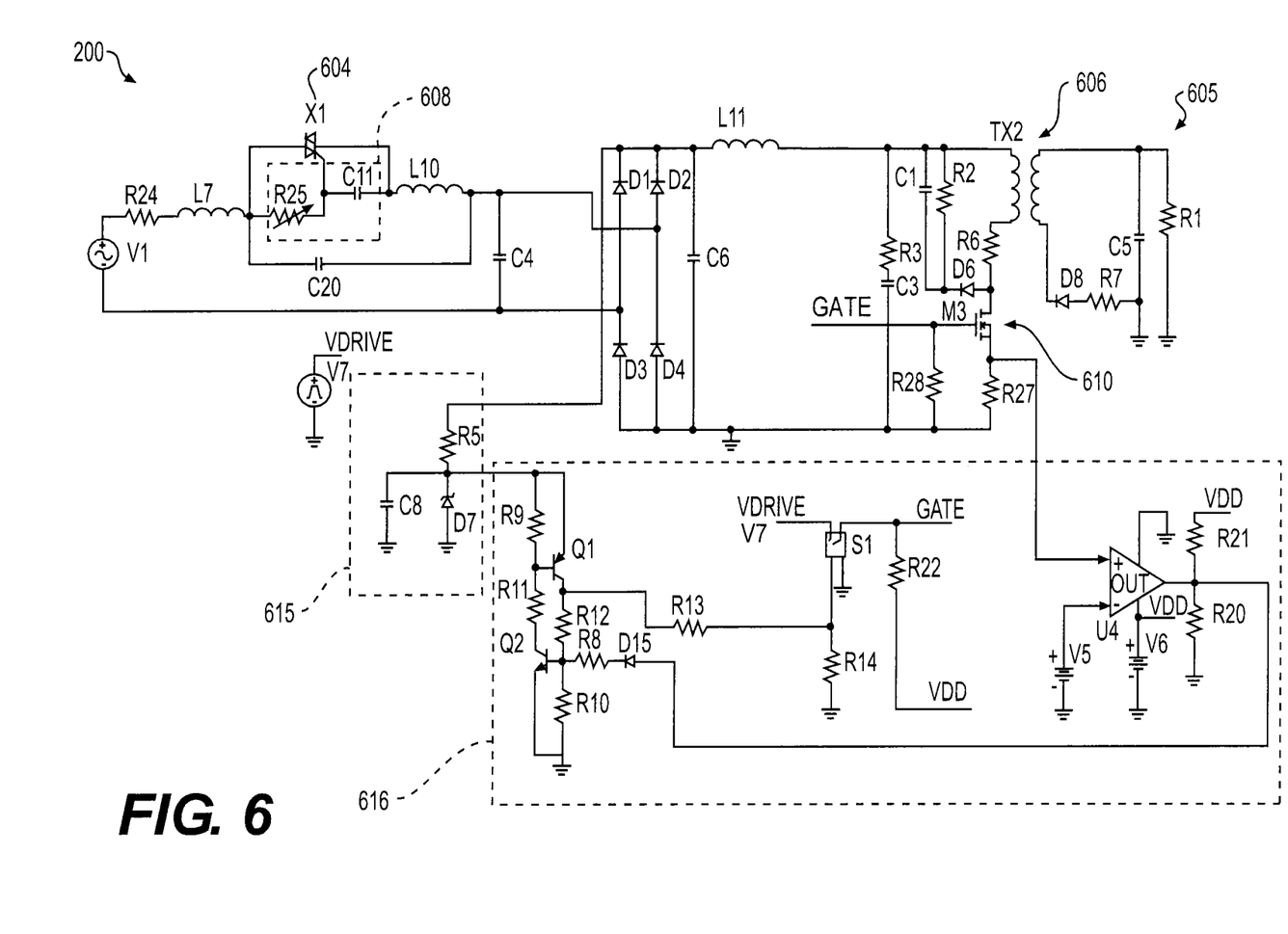
FIG. 6 depicts a more detailed example of a system according to one embodiment.

FIG. 6 depicts a more detailed example of system 200 according to one embodiment. In an embodiment, dimmer circuit 604 includes TRIAC X1; phase control circuit 608 includes R25 and C11; transformer 606 includes transformer TX2; load 605 is represented by R1; and switch 610 includes transistor M3. In an example, system 200 includes sensing circuit 615 and PWM generation circuit 616. Sensing circuit 615 is connected at a point that is downstream of dimmer circuit 604 and phase control circuit 608 and that is upstream of transformer 606. PWM generation circuit 616 is connected a point that is downstream of switch 610. In an example PWM generation circuit 616 outputs a driver signal GATE to a line connected to a gate of switch 610.

In an embodiment, sensing circuit 615 includes resistor R5, diode D7 and capacitor C8 and detects a conduction state of the dimmer circuit 604. In an example, sensing circuit detects conduction angle information of dimmer circuit 604. In an embodiment, PWM generation circuit 616 includes necessary circuit logic that, based upon the output of sensing circuit 615, drives switch 610 with the driver signal. In an example, PWM generation circuit 616 includes the circuit components depicted as PWM generation circuit 616 within FIG. 6.

In an embodiment, PWM generation circuit 616 is coupled to the sensing circuit 615. In an example, PWM generation circuit 616 includes a resistor R9 and a transistor Q1 coupled to the sensing circuit 615. In an example, the resistor R9, a resistor R11, a resistor R12, and a resistor R13 are coupled to the transistor Q1. In an example, a transistor Q2 is coupled to the resistor R11, the resistor R12, a resistor R8, a resistor R10, and ground. In an example, a diode D15 is coupled to the resistor R8.

In an embodiment, PWM generation circuit 616 includes a switch S1. In an example, the switch S1 is coupled to the resistor R13, a resistor R14, a drive voltage V7, and a gate of switch 610. In example, a resistor R22 is coupled to the gate of switch 610, the switch S1, and a voltage VDD. In an example, the resistor R14 is coupled to ground.

In an embodiment, PWM generation circuit 616 includes a comparator U4 coupled to switch 610. In an example, the comparator U4 is coupled to a voltage V5, a voltage V6, the voltage VDD, and a resistor R20. In an example, a resistor R21 is coupled to the comparator U4 and the voltage VDD. In an example, the comparator U4 and the resistor R20 are coupled to ground.

In an embodiment, if sensing circuit 615 detects that the dimmer circuit 604 is in a non-conduction state, then switch 610 is driven by PWM generation circuit 616 to be fully on or under a PWM mode based upon Vdrive. In an example, if sensing circuit 615 detects that the dimmer circuit 604 is in a conduction state, the switch 610 is driven by PWM generation circuit 616 under a peak current control. In an example, a peak current of the peak current control is determined by a current sensing resistor R27 and a reference voltage V5 of PWM generation circuit 616. Accordingly, switch 610 is controlled based upon a detected conduction state of dimmer circuit 604.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. An apparatus comprising:
    a dimmer circuit coupled to an electronic load and configured to receive an alternating current (AC) signal from an AC source;
    a phase control circuit configured to turn the dimmer circuit on for a first portion of the AC signal to transfer energy from the AC source to the electronic load, wherein the dimmer circuit turns off during a second portion of the AC signal to stop transferring the energy from the AC source to the electronic load;
    a sensing circuit configured to detect a conduction state of the dimmer circuit;
    a switch coupled to the phase control circuit; and
    a driver circuit coupled to the sensing circuit and the switch, wherein
    the switch is part of a power supply supplying power to the electronic load,
    when the sensing circuit detects that the dimmer circuit is in a non-conduction state, the driver circuit controls the switch to couple the dimmer circuit and the phase control circuit to ground, and
    the driver circuit includes:
        a first transistor coupled to a first resistor, a second resistor, a third resistor, and a fourth resistor,
        a second transistor coupled to the second resistor, the third resistor, a fifth resistor, and a sixth resistor, and
        a diode coupled to the fifth resistor.

2. The apparatus of claim 1, wherein the switch comprises a transistor included in the power supply.

3. The apparatus of claim 2, wherein the driver circuit drives the transistor with a driver signal to turn the transistor substantially on when the sensing circuit detects that the dimmer circuit is in the non-conduction state to provide a path to ground.

4. The apparatus of claim 3, wherein the driver circuit drives the transistor with a pulse width modulation (PWM) signal when the sensing circuit detects that the dimmer circuit is in the non-conduction state to provide the path to ground.

5. The apparatus of claim 2, wherein the driver circuit drives the transistor to be fully conducting when the sensing circuit detects that the dimmer circuit is in the non-conduction state is to provide a path to ground.

6. The apparatus of claim 2, wherein the driver circuit drives the transistor with a driver signal under a peak current control when the sensing circuit detects that the dimmer circuit is in the conduction state.

7. The apparatus of claim 1, wherein
    the phase control circuit comprises: a resistor; and a capacitor,
    a resistance of the resistor is set such that a charge current to the capacitor building up a capacitor voltage turns the dimmer circuit on when the AC signal reaches a threshold voltage level, and
    the capacitor is discharged when the dimmer circuit is off through a path to ground, the path to ground including the switch and a resistive load.

8. The apparatus of claim 7, wherein the dimmer circuit is turned on when the capacitor voltage reaches a threshold level while the dimmer circuit is off.

9. The apparatus of claim 1, wherein the electronic load comprises a light emitting diode (LED) or fluorescent light.

10. The apparatus of claim 1, further comprising a coil, wherein:
    the switch is coupled to the coil allowing energy to be stored in the coil, and
    the coil is coupled to a load circuit in the electronic load to transfer the energy to the load circuit.

11. The apparatus of claim 10, wherein the transfer of energy is controlled by the switch to provide dimming of the load circuit.

12. The apparatus of claim 10, wherein
    the coil is a first coil in a transformer,
    the energy is stored in the first coil, and
    the energy is transferred to a second coil to transfer the energy to the load circuit.

13. The apparatus of claim 10, wherein
    the driver circuit turns the switch on and off using a duty cycle of a pulse width modulation (PWM) signal to cause energy to be transferred to the load circuit, and
    the transfer of energy is controlled by the duty cycle of the PWM signal to provide dimming of the load circuit.

14. The apparatus of claim 10, wherein
    the coil is a first coil in a transformer,
    the energy is stored in the first coil, and
    the energy is transferred to the load circuit through the first coil.

15. The apparatus of claim 1, wherein
    the driver circuit further includes a second switch coupled to the fourth resistor, a seventh resistor, a first voltage, the switch, and an eighth resistor, and
    the eight resistor is coupled to a second voltage and the switch.

16. The apparatus of claim 15, wherein
    the driver circuit further includes a comparator coupled to the switch, a third voltage, a fourth voltage, a ninth resistor, a tenth resistor, the second voltage, and the diode, and
    the ninth resistor is coupled to the second voltage.

17. The apparatus of claim 1, wherein the driver circuit further includes a comparator coupled to the switch, a first voltage, a second voltage, a seventh resistor, an eighth resistor, a third voltage, and the diode, and the seventh resistor is coupled to the second voltage.

18. A method comprising:

turning a dimmer circuit on for a first portion of an AC signal using a phase control circuit to transfer energy from an AC source to an electronic load;

turning the dimmer circuit off during a second portion of the AC signal to stop transferring the energy from the AC source to the electronic load;

detecting a conduction state of the dimmer circuit; and controlling a switch to couple the AC signal through the dimmer circuit and a phase control circuit to ground when a non-conduction state of the dimmer circuit is detected, wherein the switch is part of a power supply supplying power to the electronic load, and controlling the switch includes controlling the switch using:

a first transistor coupled to a first resistor, a second resistor, a third resistor, and a fourth resistor, a second transistor coupled to the second resistor, the third resistor, a fifth resistor, and a sixth resistor, and a diode coupled to the fifth resistor.

19. The method of claim 18, wherein controlling the switch includes driving a transistor of the switch with a driver signal to turn on the transistor when the non-conduction state of the dimmer circuit is detected to provide a path to ground through the dimmer and the phase control circuit.

20. The method of claim 19, wherein controlling the switch includes driving the transistor with a pulse width modulation (PWM) signal when the non-conduction state of the dimmer circuit is turned detected to provide the path to ground.

21. The method of claim 18, further comprising:

storing energy in a coil of the electronic load while the dimmer circuit is on; and transferring the energy to a load circuit of the electronic load based on a duty cycle of a pulse width modulation (PWM) driver signal driving the switch to provide dimming of the load circuit.

22. The method of claim 21, wherein the duty cycle of the PWM driver signal controls turning the switch on and off to control an amount of dimming of the load circuit.

23. The method of claim 18, wherein the electronic load comprises a light emitting diode (LED) or fluorescent light.

\* \* \* \* \*